B. C. BRADLEY.
Caster Colter and Jointer.

No. 243,102.  Patented June 21, 1881.

Witnesses:
H. W. Murphy
E. T. Bond

Inventor:
Byron C Bradley
By West & Bond
Attys.

UNITED STATES PATENT OFFICE.

BYRON C. BRADLEY, OF CHICAGO, ILLINOIS, ASSIGNOR TO FURST & BRADLEY MANUFACTURING COMPANY, OF SAME PLACE.

CASTER-COLTER AND JOINTER.

SPECIFICATION forming part of Letters Patent No. 243,102, dated June 21, 1881.

Application filed November 25, 1879.

*To all whom it may concern:*

Be it known that I, BYRON C. BRADLEY, residing at Chicago, in the county of Cook and State of Illinois, and a citizen of the United States, have invented a new and useful Improvement in Caster-Colters and Jointers, of which the following is a full description, reference being had to the accompanying drawings, in which—

Figure 1:
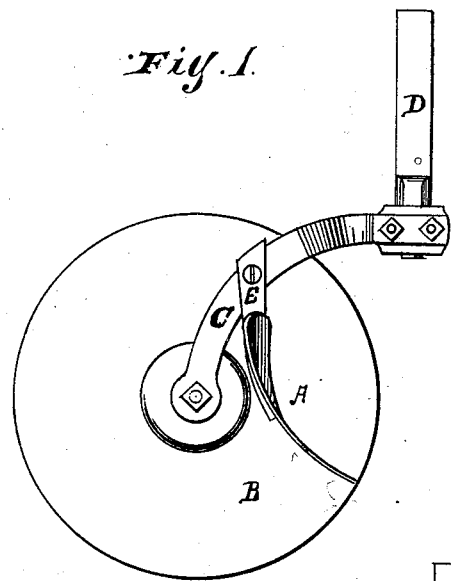
Figure 2:
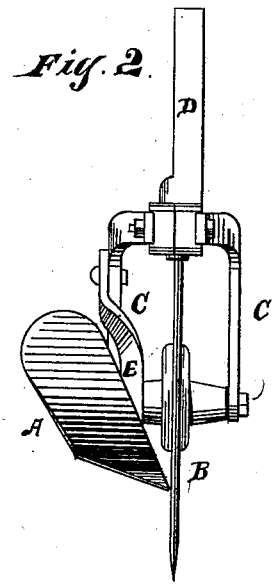
Figure 3:
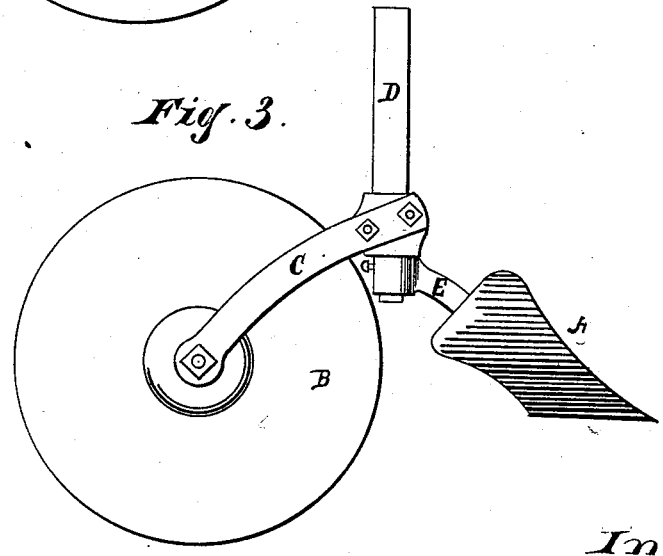

Figure 1 is a side elevation, and Fig. 2 an edge elevation, showing the jointer attached to the fork of the colter; Fig. 3, a side elevation, showing the jointer attached to the colter-standard.

In plowing sod ground or soil with stubble, grass, and weeds, it is customary to use a colter for the purpose of making an incision through the sod, stubble, &c., into the soil, to facilitate the action of the plow and enable it to do clean work, and the form of colter now generally used is what is termed a "caster" or "rolling" colter, located in front of the plow-breast, so as to make a vertical cut the width of the furrow-slice. It has also been customary to use what is termed a "jointer" or "small share," preceding the plowshare proper, for the purpose of cutting loose a strip of the crust or surface of the soil on the land side of the furrow-slice and turning it over onto the outer edge of the furrow-slice for overturning the crust into the bottom of the furrow, where it will be covered by the soil turned over by the plow proper.

The essential object of my invention is to provide a single point of attachment between the plow-beam and the caster-colter and jointer; and its nature consists in firmly attaching the jointer to the colter-standard or to the colter-fork, so that one point of attachment to the plow-beam is common to both the colter and jointer, and the two will be in the proper relation to do their respective work under all circumstances—the colter to make its vertical cut and the jointer to turn a strip from the inner edge of the furrow crust over onto the outer edge.

In the drawings, A is the jointer, so formed as to cut a strip of the required width from the land side of the furrow-slice in advance of the plowshare, to insure the overturning of the crust, and having a contour on its share that will turn the strip so cut loose over into the outer edge of the furrow-slice. This jointer may have its share formed in the usual manner of such devices.

B is the caster-colter, so formed as to enter the soil, cutting through the sod and producing a vertical cut of the required depth and of the width of the furrow-slice.

C is the caster fork or arms, in the lower ends of which the colter-spindle is journaled in the usual manner.

D is the colter-standard, adapted to be attached at its upper end to the plow-beam so as to be adjusted higher or lower, and having the caster fork or arms pivoted to its lower end in the usual manner.

E is a rigid bar or support, attached firmly at one end to the plowshare, and having its other end attached firmly either to the caster-fork, as shown in Figs. 1 and 2, or to the colter-standard, as shown in Fig. 3. This bar E is of such length and so formed and attached to the jointer and to the colter fork or standard as to adjust the jointer and colter for their respective work in reference to the plow proper.

When the jointer is attached to the fork of the colter the colter may be set to one side of the center of the pivot of the fork to the standard, to overcome the tendency of the jointer to draw the colter away from the land side of the furrow by the tendency of the pivoting to one side of the pivotal center, which will draw it in the opposite direction, thereby keeping the colter in a straight line of travel.

In use the colter makes the vertical cut as usual, and the jointer cuts loose a strip from the top of the furrow-slice on the land side and turns it over onto the outer edge of the furrow-slice, so that the entire upper surface of the furrow-slice will be turned under and the grass, weeds, &c., will be covered by the soil turned over by the plow, the rigid attachment by the support E keeping the jointer and colter properly adjusted for each to do its work without interfering with the other in any manner.

I do not claim a caster-colter journaled to an inclined arm attached at one side of a plow-beam, and a jointer arranged adjacent to the caster-colter and carried by another arm, also attached to the plow-beam in front of the arm carrying the caster, as such arrangement and construction do not constitute my invention.

What I claim as new, and desire to secure by Letters Patent, is—

In combination with the standard D, the attached fork C, having its depending arms embracing and carrying the rotary caster-colter, and the rigid bar E, secured directly to the fork or standard and provided with the jointer A, substantially as described, whereby the standard serves as a single point of connection between the plow-beam and both the caster-colter and jointer, as set forth.

BYRON C. BRADLEY.

Witnesses:
O. W. BOND,
H. W. MURPHY.